(12) United States Patent
Malviya et al.

(10) Patent No.: US 10,997,769 B2
(45) Date of Patent: May 4, 2021

(54) SYSTEM AND METHOD FOR GENERATING AN ANIMATED DISPLAY

(71) Applicant: HONEYWELL INTERNATIONAL INC., Morris Plains, NJ (US)

(72) Inventors: Pramod Kumar Malviya, Bangalore (IN); Thea Feyereisen, Hudson, WI (US); Gang He, Morris Plains, NJ (US); Rui Wang, Morris Plains, NJ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 16/525,087

(22) Filed: Jul. 29, 2019

(65) Prior Publication Data

US 2020/0134900 A1 Apr. 30, 2020

(30) Foreign Application Priority Data

Oct. 31, 2018 (IN) .............................. 201841041163

(51) Int. Cl.
*G06T 13/80* (2011.01)
*G06F 3/14* (2006.01)
*G09G 5/02* (2006.01)
*G08G 5/00* (2006.01)

(52) U.S. Cl.
CPC ............ *G06T 13/80* (2013.01); *G06F 3/1423* (2013.01); *G08G 5/003* (2013.01); *G09G 5/026* (2013.01); *G09G 2320/08* (2013.01); *G09G 2354/00* (2013.01); *G09G 2380/12* (2013.01)

(58) Field of Classification Search
CPC ......... G06T 13/80; G06F 3/1423; G06F 3/14; G06F 3/00; G06F 3/048; G09G 5/026; G09G 2320/08; G09G 2354/00; G09G 2380/12; G09G 5/02; G08G 5/003;
(Continued)

(56) References Cited

U.S. PATENT DOCUMENTS

| 9,858,823 B1 * | 1/2018 | Lynn | ..................... G07C 5/0808 |
| 2002/0112180 A1 * | 8/2002 | Land | ..................... G11B 27/034 726/26 |
| 2007/0168122 A1 | 7/2007 | Aspen | |

(Continued)

FOREIGN PATENT DOCUMENTS

| EP | 2610590 A2 | 7/2013 |
| WO | O2014062102 A1 | 4/2014 |

*Primary Examiner* — Xilin Guo
(74) *Attorney, Agent, or Firm* — Lorenz & Kopf, LLP

(57) ABSTRACT

Methods and systems are provided for generating an animated display for an aircraft. The method comprises receiving a user request for a change in a layer shown on a display that shows a view of the flight plan data for the aircraft. The user request is received by a user interface (UI) that is part of a map layer display system located onboard the aircraft. The system determines which specific layer corresponds to user request for a change to the display. When the user request is to add the layer to the display, the opaqueness of the layer increases from zero percent to one-hundred percent. When the user request is to remove the layer from the display, the opaqueness of the layer decreases from one-hundred percent to zero percent. Finally, the system generates instructions to display the layer at the opaqueness on the display.

20 Claims, 4 Drawing Sheets

(58) Field of Classification Search
CPC ...... G08G 5/00; G08G 5/0013; G08G 5/0039; B64C 2201/027
See application file for complete search history.

(56) References Cited

U.S. PATENT DOCUMENTS

| | | |
|---|---|---|
| 2008/0231643 A1 | 9/2008 | Fletcher et al. |
| 2012/0232785 A1* | 9/2012 | Wiesemann .......... G01C 23/00 701/423 |
| 2013/0321399 A1 | 12/2013 | Rohlf |
| 2014/0071119 A1 | 3/2014 | Piemonte et al. |
| 2017/0138759 A1* | 5/2017 | Turner ................. G08G 5/0052 |
| 2018/0226101 A1* | 8/2018 | Taylor ................... G11B 27/02 |

* cited by examiner

SYSTEM AND METHOD FOR GENERATING AN ANIMATED DISPLAY

CROSS-REFERENCE TO RELATED APPLICATION(S)

This application claims priority from Indian Provisional Patent Application No. 201841041163, titled "ANIMATED AIRCRAFT DISPLAY" that was filed Oct. 31, 2018.

TECHNICAL FIELD

The present disclosure generally relates to aircraft operations, and more particularly relates to systems and methods for generating an animated display.

BACKGROUND

During operations, such as flight operations in an aircraft, the aircraft often includes multiple displays in a cockpit with each display including data related to the aircraft or a flight plan. The displays may include different layers of displays such as vertical situation displays, lateral situation displays, synthetic vision displays, and the like. However, there is a need for a system and method for generating an animated aircraft display that avoids abrupt transitions between layers.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

A system is provided for generating an animated display for an aircraft. The system comprises: a flight management system (FMS) configured to control one or more control systems of the aircraft based upon flight plan data for the aircraft; and a map layer display system that is controlled by the FMS, comprising, a plurality of displays, where each of the plurality of displays shows a different view of the flight plan data; a user interface (UI) system configured to receive user input; and a processor communicatively coupled to the plurality of displays and the UI, the processor configured to: determine when the user input received by the UI corresponds to a layer on one of the plurality of displays; increase, when the user input includes a request to add the layer to one of the plurality of displays, opaqueness of the layer from zero percent to one-hundred percent; decrease, when the user input includes a request to remove the layer from one of the plurality of displays, opaqueness of the layer from one-hundred percent to zero-percent; and generate instructions to display the layer at the opaqueness of the layer.

A method is provided for a method for generating an animated display. The method comprises: receiving a user request for a change in a layer shown on a display that shows a view of data, where the user request is received by a user interface (UI) that is part of a map layer display system; determining which specific layer corresponds to the user request for a change to the display; increasing opaqueness of the layer from zero percent to one-hundred percent when the user request is to add the layer to the display; decreasing opaqueness of the layer from one-hundred percent to zero percent when the user request is to remove the layer from the display; and generating instructions to display the layer at the set opaqueness on the display.

Furthermore, other desirable features and characteristics of the method and system will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

A method and system has been developed for generating an animated display. The method comprises receiving a user request for a change in a layer shown on a display that shows a view of relevant data. The user request is received by a user interface (UI) that is part of a map layer display system. The system determines which specific layer corresponds to user request for a change to the display. When the user request is to add the layer to the display, the opaqueness of the layer gradually increases from zero percent to one-hundred percent. When the user request is to remove the layer from the display, the opaqueness of the layer gradually decreases from one-hundred percent to zero percent. Finally, the system generates instructions to display the layer at the opaqueness on the display.

Before proceeding further, it is noted that, for convenience, the following description is in the context of an aircraft environment. It will be appreciated, however, that the claimed invention is not limited to any particular aircraft environment, but may be implemented in numerous other vehicular and non-vehicular environments.

Figure 1:
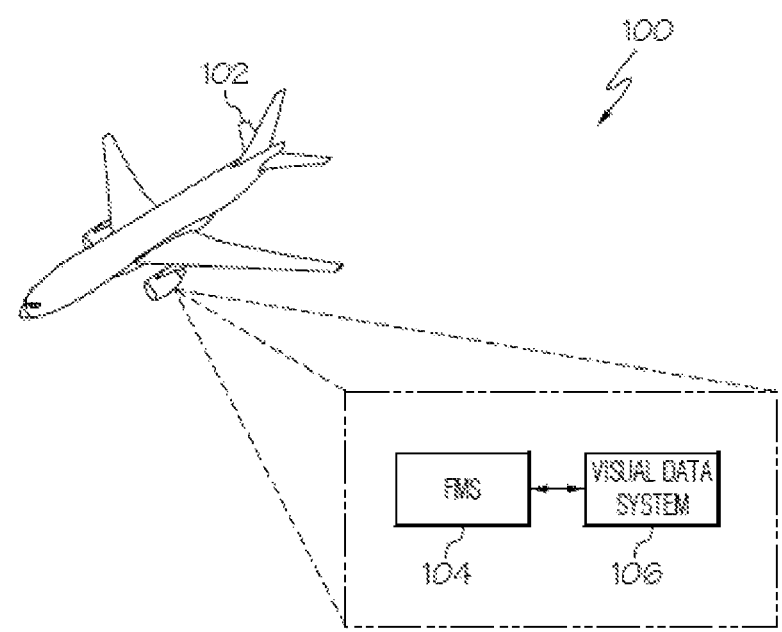
FIG. 1 shows a diagram of an in-flight aircraft that contains an onboard flight management system (FMS) along with a visual data system in accordance with one embodiment.

Turning now to FIG. 1, a diagram 100 is shown of an in-flight aircraft 102 that contains an onboard flight management system (FMS) 104 along with a visual data system 106 that is accessed by the FMS 104 in accordance with one embodiment. In alternative embodiments, the visual data system 106 may be integrated as part of the FMS 104. The FMS 104, as is generally known, is a specialized computer that automates a variety of in-flight tasks such as in-flight management of the flight plan. Using various sensors such as global positioning system (GPS), the FMS 104 determines the aircraft's position and guides the aircraft along its flight plan using its navigation database. From the cockpit, the FMS 104 is normally controlled through a visual display device such as a control display unit (CDU) which incorporates a small screen, a keyboard or a touchscreen. The FMS 104 displays the flight plan and other critical flight data to the aircrew during operation.

The FMS 104 may have a built-in electronic memory system that contains a navigation database. The navigation database contains elements used for constructing a flight plan. In some embodiments, the navigation database may be separate from the FMS 104 and located onboard the aircraft while in other embodiments the navigation database may be located on the ground and relevant data provided to the FMS 104 via a (non-illustrated) communications link with a (non-illustrated) ground station. The navigation database used by the FMS 104 may typically include: waypoints/intersections; airways; radio navigation aids/navigation beacons; airports; runway; standard instrument departure (SID) information; standard terminal arrival (STAR) information; holding patterns; and instrument approach procedures. Additionally, other waypoints may also be manually defined by pilots along the route.

The flight plan is generally determined on the ground before departure by either the pilot or a dispatcher for the owner of the aircraft. It may be manually entered into the FMS 104 or selected from a library of common routes. In other embodiments the flight plan may be loaded via a communications data link from an airline dispatch center. During preflight planning, additional relevant aircraft performance data may be entered including information such as: gross aircraft weight; fuel weight and the center of gravity of the aircraft. The aircrew may use the FMS 104 to modify the plight flight plan before takeoff or even while in flight for variety of reasons. Such changes may be entered via the CDU. Once in flight, the principal task of the FMS 104 is to accurately monitor the aircraft's position. This may use a GPS, a VHF omnidirectional range (VOR) system, or other similar sensor in order to determine and validate the aircraft's exact position. The FMS 104 constantly cross checks among various sensors to determine the aircraft's position with accuracy.

Additionally, the FMS 104 may be used to perform advanced vertical navigation (VNAV) functions. The purpose of VNAV is to predict and optimize the vertical path of the aircraft. The FMS 104 provides guidance that includes control of the pitch axis and of the throttle of the aircraft. In order to accomplish these tasks, the FMS 104 has detailed flight and engine model data of the aircraft. Using this information, the FMS 104 may build a predicted vertical descent path for the aircraft. A correct and accurate implementation of VNAV has significant advantages in fuel savings and on-time efficiency.

In exemplary embodiments, an existing flight management computer (FMC) (or flight management system (FMS)) onboard an aircraft is utilized to communicate data between existing onboard avionics systems or line-replaceable units (LRUs) and another module coupled to the FMC, which supports or otherwise performs new flight management functionality that is not performed by the FMC. For example, a multifunction control and display unit (MCDU) may support or otherwise perform new flight management functionality based on data from onboard avionics or LRUs received via the FMC. In this regard, the FMC is configured to receive operational or status data from one or more avionics systems or LRUs onboard the aircraft at corresponding avionics interfaces and convert one or more characteristics of the operational data to support communicating the operational data with the MCDU. For purposes of explanation, the subject matter may primarily be described herein in the context of converting operational data received from onboard avionics or LRUs in a first format (e.g., an avionics bus format) into another format supported by the interface with the MCDU, the subject matter described herein is not necessarily limited to format conversions or digital reformatting, and may be implemented in an equivalent manner for converting between other data characteristics, such as, for example, different data rates, throughputs or bandwidths, different sampling rates, different resolutions, different data compression ratios, and the like.

Figure 2:
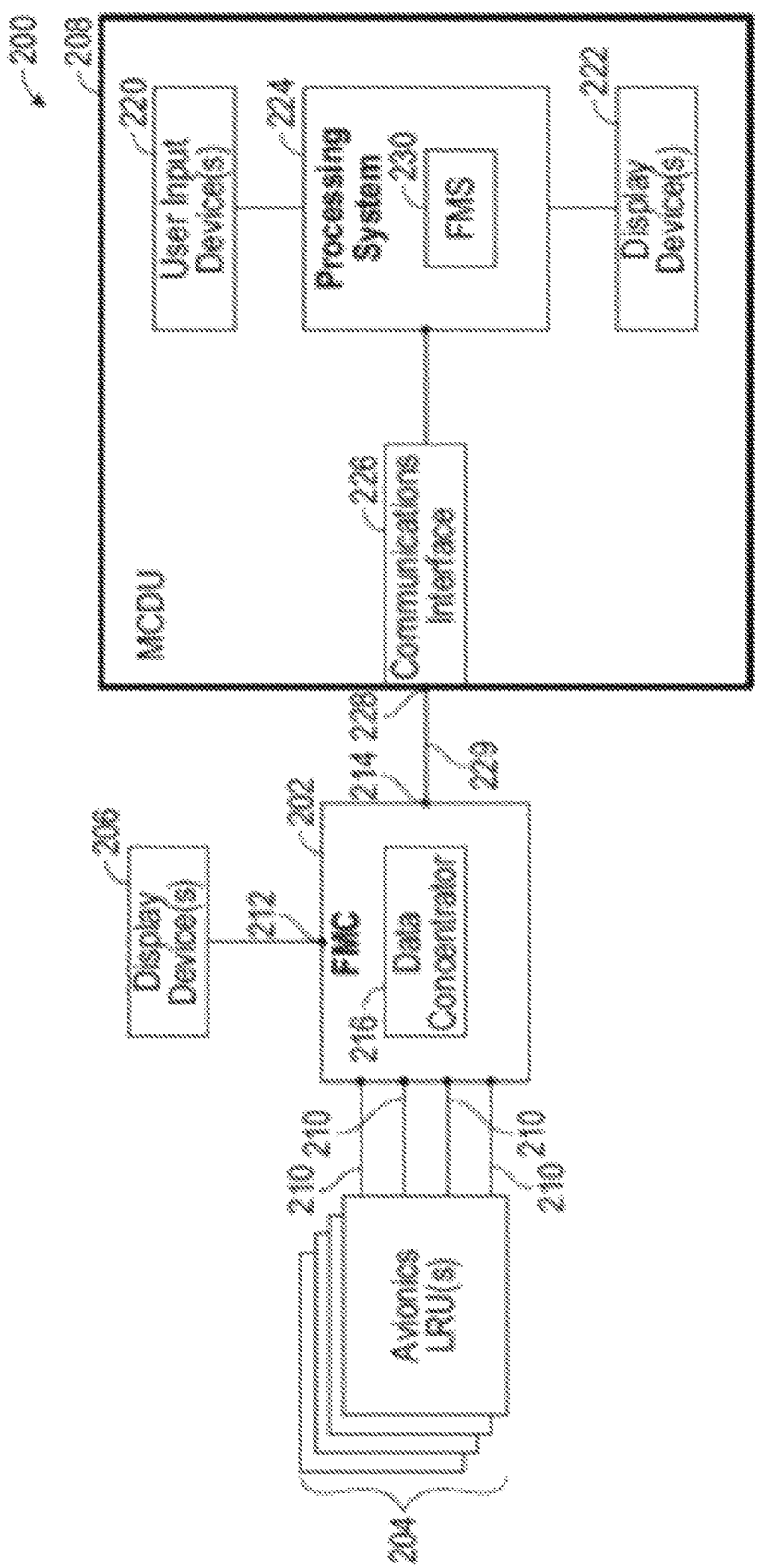
FIG. 2 shows a block diagram of a flight management computer (FMC) (or flight management system (FMS)) onboard an aircraft utilized to communicate data between existing onboard avionics systems or line-replaceable units (LRUs) in accordance with one embodiment.

FIG. 2 depicts an exemplary embodiment of an aircraft system 200 suitable for implementation onboard an aircraft 102 shown previously in FIG. 1. The illustrated aircraft system 200 includes a flight management computing module 202 communicatively coupled to a plurality of onboard avionics LRUs 204, one or more display devices 206, and a multifunction computing module 208. It should be appreciated that FIG. 2 depicts a simplified representation of the aircraft system 200 for purposes of explanation, and FIG. 2 is not intended to limit the subject matter in any way.

The flight management computing module 202 generally represents the FMC, the FMS, or other hardware, circuitry, logic, firmware and/or other components installed onboard the aircraft and configured to perform various tasks, functions and/or operations pertaining to flight management, flight planning, flight guidance, flight envelope protection, four-dimensional trajectory generation or required time of arrival (RTA) management, and the like. Accordingly, for purposes of explanation, but without limiting the functionality performed by or supported at the flight management computing module 202, the flight management computing module 202 may alternatively be referred to herein as the FMC. The FMC 202 includes a plurality of interfaces 210 configured to support communications with the avionics LRUs 204 along with one or more display interfaces 212 configured to support coupling one or more display devices 206 to the FMC 202. In the illustrated embodiment, the FMC 202 also includes a communications interface 214 that supports coupling the multifunction computing module 208 to the FMC 202.

The FMC 202 generally includes a processing system designed to perform flight management functions, and potentially other functions pertaining to flight planning, flight guidance, flight envelope protection, and the like. Depending on the embodiment, the processing system could be realized as or otherwise include one or more processors, controllers, application specific integrated circuits, programmable logic devices, discrete gate or transistor logics, discrete hardware components, or any combination thereof. The processing system of the FMC 202 generally includes or otherwise accesses a data storage element (or memory), which may be realized as any sort of non-transitory short or long term storage media capable of storing programming instructions for execution by the processing system of the FMC 202. In exemplary embodiments, the data storage element stores or otherwise maintains code or other computer-executable programming instructions that, when read and executed by the processing system of the FMC 202, cause the FMC 202 to implement, generate, or otherwise support a data concentrator application 216 that performs certain tasks, operations, functions, and processes described herein.

The avionics LRUs 204 generally represent the electronic components or modules installed onboard the aircraft that support navigation, flight planning, and other aircraft control functions in a conventional manner and/or provide real-time data and/or information regarding the operational status of the aircraft to the FMC 202. For example, practical embodiments of the aircraft system 200 will likely include one or more of the following avionics LRUs 204 suitably configured to support operation of the aircraft: a weather system, an air traffic management system, a radar system, a traffic avoidance system, an autopilot system, an autothrottle (or autothrust) system, a flight control system, hydraulics systems, pneumatics systems, environmental systems, electrical systems, engine systems, trim systems, lighting systems, crew alerting systems, electronic checklist systems, and/or another suitable avionics system.

In exemplary embodiments, the avionics interfaces 210 are realized as different ports, terminals, channels, connectors, or the like associated with the FMC 202 that are connected to different avionics LRUs 204 via different wiring, cabling, buses, or the like. In this regard, the interfaces 210 may be configured to support different communications protocols or different data formats corresponding to the respective type of avionics LRU 204 that is connected to a particular interface 210. For example, the FMC 202 may communicate navigation data from a navigation system via a navigation interface 210 coupled to a data bus supporting the ARINC 424 (or A424) standard, the ARINC 629 (or A629) standard, the ARINC 422 (or A422) standard, or the like. As another example, a datalink system or other communications LRU 204 may utilize an ARINC 619 (or A619) compatible avionics bus interface for communicating datalink communications or other communications data with the FMC 202.

The display device(s) 206 generally represent the electronic displays installed onboard the aircraft in the cockpit, and depending on the embodiment, could be realized as one or more monitors, screens, liquid crystal displays (LCDs), a light emitting diode (LED) displays, or any other suitable electronic display(s) capable of graphically displaying data and/or information provided by the FMC 202 via the display interface(s) 212. Similar to the avionics interfaces 210, the display interfaces 212 are realized as different ports, terminals, channels, connectors, or the like associated with the FMC 202 that are connected to different cockpit displays 206 via corresponding wiring, cabling, buses, or the like. In one or more embodiments, the display interfaces 212 are configured to support communications in accordance with the ARINC 661 (or A661) standard. In one embodiment, the FMC 202 communicates with a lateral map display device 206 using the ARINC 702 (or A702) standard.

In exemplary embodiments, the multifunction computing module 208 is realized as a multifunction control and display unit (MCDU) that includes one or more user interfaces, such as one or more input devices 220 and/or one or more display devices 222 (shown previously as 106 in FIG. 1), a processing system 224, and a communications module 226. The MCDU 208 generally includes at least one user input device 220 that is coupled to the processing system 224 and capable of receiving inputs from a user, such as, for example, a keyboard, a key pad, a mouse, a joystick, a directional pad, a touchscreen, a touch panel, a motion sensor, or any other suitable user input device or combinations thereof. The display device(s) 222 may be realized as any sort of monitor, screen, LCD, LED display, or other suitable electronic display capable of graphically displaying data and/or information under control of the processing system 224.

The processing system 224 generally represents the hardware, circuitry, logic, firmware and/or other components of the MCDU 208 configured to perform the various tasks, operations, functions and/or operations described herein. Depending on the embodiment, the processing system 224 may be implemented or realized with a general purpose processor, a microprocessor, a controller, a microcontroller, a state machine, an application specific integrated circuit, a field programmable gate array, any suitable programmable logic device, discrete gate or transistor logic, discrete hardware components, or any combination thereof, designed to perform the functions described herein. Furthermore, the steps of a method or algorithm described in connection with the embodiments disclosed herein may be embodied directly in hardware, in firmware, in a software module executed by the processing system 224, or in any practical combination thereof. In this regard, the processing system 224 includes or accesses a data storage element (or memory), which may be realized using any sort of non-transitory short or long term storage media, and which is capable of storing code or other programming instructions for execution by the processing system 224. In exemplary embodiments described herein, the code or other computer-executable programming instructions, when read and executed by the processing system 224, cause the processing system 224 to implement with an FMS 230 (shown previously as 104 in FIG. 1) additional tasks, operations, functions, and processes described herein.

The communications module 226 generally represents the hardware, module, circuitry, software, firmware and/or combination thereof that is coupled between the processing system 224 and a communications interface 228 of the MCDU 208 and configured to support communications between the MCDU 208 and the FMC 202 via an electrical connection 229 between the MCDU communications interface 228 and the FMC communications interface 214. For example, in one embodiment, the communications module 226 is realized as an Ethernet card or adapter configured to support communications between the FMC 202 and the MCDU 208 via an Ethernet cable 229 provided between Ethernet ports 214, 228. In other embodiments, the communications module 226 is configured to support communications between the FMC 202 and the MCDU 208 in accordance with the ARINC 429 (A429) standard via an A429 data bus 229 provided between A429 ports 214, 228 of the respective modules 202, 208. In yet other embodiments, the communications module 226 is configured to support communications between the FMC 202 and the MCDU 208 in accordance with the ARINC 422 (A422) standard via an A422 data bus 229 provided between A422 ports 214, 228 of the respective modules 202, 208. In yet other embodiments, the communications module 226 is configured to support communications between the FMC 202 and the MCDU 208 in accordance with the ARINC 739 (A739) standard via an A739 data bus 229 provided between A739 ports 214, 228 of the respective modules 202, 208.

In various embodiments, the FMC 202 and MCDU 208 communicate using a different communications protocol or standard than one or more of the avionics LRUs 204 and/or the display devices 206. In such embodiments, to support communications of data between the MCDU 208 and those LRUs 204 and/or display devices 206, the data concentrator application 216 at the FMC 202 converts data from one format to another before retransmitting or relaying that data to its destination. For example, the data concentrator application 216 may convert data received from an avionics LRU 204 to the A429 or Ethernet format before providing the data to the MCDU 208, and vice versa. Additionally, in exemplary embodiments, the FMC 202 validates the data received from an avionics LRU 204 before transmitting the data to the MCDU 208. For example, the FMC 202 may perform debouncing, filtering, and range checking, and/or the like prior to converting and retransmitting data from an avionics LRU 204.

It should be noted that although the subject matter may be described herein in the context of the multifunction computing module 208 being realized as an MCDU, in alternative embodiments, the multifunction computing module 208 could be realized as an electronic flight bag (EFB) or other mobile or portable electronic device. In such embodiments, an EFB capable of supporting an FMS 230 application may be connected to an onboard FMC 202 using an Ethernet cable 229 to support flight management functionality from the EFB in an equivalent manner as described herein in the context of the MCDU.

In one or more embodiments, the MCDU 208 stores or otherwise maintains programming instructions, code, or other data for programming the FMC 202 and transmits or otherwise provides the programming instructions to the FMC 202 to update or otherwise modify the FMC 202 to implement the data concentrator application 216. For example, in some embodiments, upon establishment of the connection 229 between modules 202, 208, the MCDU 208 may automatically interact with the FMC 202 and transmit or otherwise provide the programming instructions to the FMC 202, which, in turn, executes the instructions to implement the data concentrator application 216. In some embodiments, the data concentrator application 216 may be implemented in lieu of flight management functionality by the MCDU 208 reprogramming the FMC 202. In other embodiments, the FMC 202 may support the data concentrator application 216 in parallel with flight management functions. In this regard, the FMC 202 may perform flight management functions, while the FMS 230 application on the MCDU 208 supplements the flight management functions to provide upgraded flight management functionality within the aircraft system 200.

Figure 3:
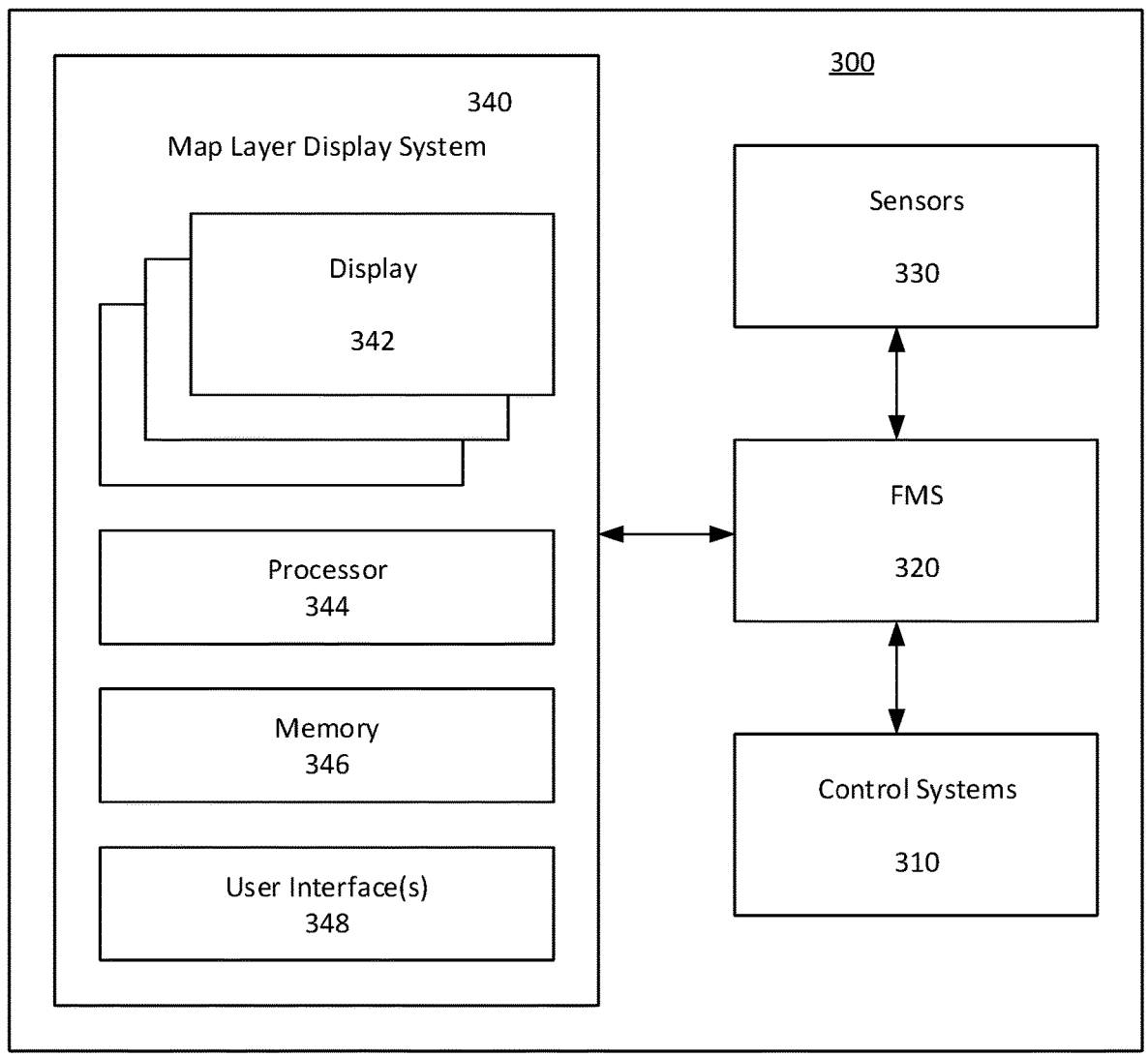
FIG. 3 shows a block diagram of a visual display system with a map layer display in accordance with one embodiment.

FIG. 3 illustrates an MCDU 300 (shown previously as 208 in FIG. 2), in accordance with an embodiment. The MCDU 300 may be used onboard an airplane, a helicopter, a spacecraft, a drone, or the like, or any combination thereof. The aircraft includes multiple controls systems 310 for controlling the movement of the MCDU 300. The controls systems 310 will vary depending upon the type of aircraft, but may include, for example, one or more engines, rudders, wings, vertical stabilizers, flaps, landing gear, propellers, and the like.

The MCDU 300 further includes a flight management system (FMS) 320. The flight management system 320 manages a flight plan of the aircraft and may use sensors 330 to guide the aircraft along the flight plan utilizing one or more of the control systems 310. The sensors 330 may include, for example, a global positioning system (GPS) sensor, an altitude sensor, a wind speed sensor, a wind direction sensor, or the like. The MCDU 300 further includes a map layer display system 340. The map layer display system 340 controls the presentation of various map layers to improve a user's experience with a display on the MCDU 300. The map layer display system 340 may include one or more displays 342 on the MCDU 300. The displays 342 may include, for example, a lateral situation display, a vertical situation display, a synthetic vision display, or any other display on the aircraft and any combination thereof.

The map layer display system 340 further includes a processor 344 and a memory 346. The processor 344 may be, for example, a central processing unit (CPU), a physics processing unit (PPU), a graphics processing unit (GPU), a field programmable gate array (FPGA), an application specific integrated circuit (ASIC), a microcontroller, or any other logic unit or combination thereof. The memory 346 may be any combination of volatile and non-volatile memory. The memory 346 may store non-transitory computer-readable instructions for implementing the map layer display system 340, as discussed in further detail below. The processor 344 and a memory 346 may be dedicated to the map layer display system 340 or may be shared by one or more other systems in the MCDU 300.

The memory 346 may further store data corresponding to different layers on a map. The layers may include, for example, terrain data, traffic data, flight plan data, fixes (airports, VHF omnidirectional range (VOR), non-directional beacon (NDB) locations, intersections, VOR courses), airspaces, boundaries, gridlines, and the like. Different displays 342 may have different layers depending upon what each display is capable of displaying. The map layer display system 340 fades-in and fades-out layers on the display during range changes, pan changes and display option changes. The display option changes may occur when a user adds or removes a layer from the map using a user interface 348. The user interface 348 may include any combination of a touch screen, a mouse, a trackpad, a trackball, a microphone, buttons, switches, or the like.

As an example, a user could select to remove traffic data from a lateral situation display map. Instead of a sudden shift reflecting the new option, the layer corresponding to the traffic data would fade-out. This fading-in and fading-out improves the user's experience by giving them a better appreciation of the change by giving them enough time to visualize the data that is fading in or out. Visual Aesthetics or "look and feel" is one of the most important features of any graphical user interface. Better aesthetics makes the interface user-friendlier and more popular. Better aesthetics helps the user to understand the meaning of various components and memorize the navigation paths. A better look and feel ultimately makes a GUI more efficient and effective.

The processor 344 may perform the gradual fade-in and fade-out of layers using an animated fade-in or fade-out technique, where previous state/scene/layers gets faded in or out slowly and a new scene is rendered smoothly. This makes the whole state/scene/layer smoothly transition. To achieve the smooth fade-in or fade-out transition, the processor 344 decreases opaqueness and size of a layer (e.g., last icon/symbol) gradually while the same time opaqueness and size of any new layer (e.g., layer which was underneath a removed layer or new icon/symbol/layers) increases gradually until it reaches to a desired opaqueness and size. The rate at which the layer transparency transitions from one state to the other can be a constant or the rate of transition can be controlled by an event such as a threat condition that becomes present within one of the layers.

For any terrain changes from, for example, a pan or a zoom request, the processor 344 generates instructions for the display 342 to fade out the old terrain data and gradually introduce the new terrain data with some blurriness effect to provide a smooth fade in fade out transition during abrupt terrain scene changes. In one embodiment, for example, the processor 344 may blend the existing terrain layer with the new terrain layer to achieve the effect. The change in opaqueness of each layer may be performed on a frame-by-frame basis. In other words, the processor 344 may increase/decrease the opaqueness of a layer gradually over multiple frames of a display.

Figures 4A, 4B:
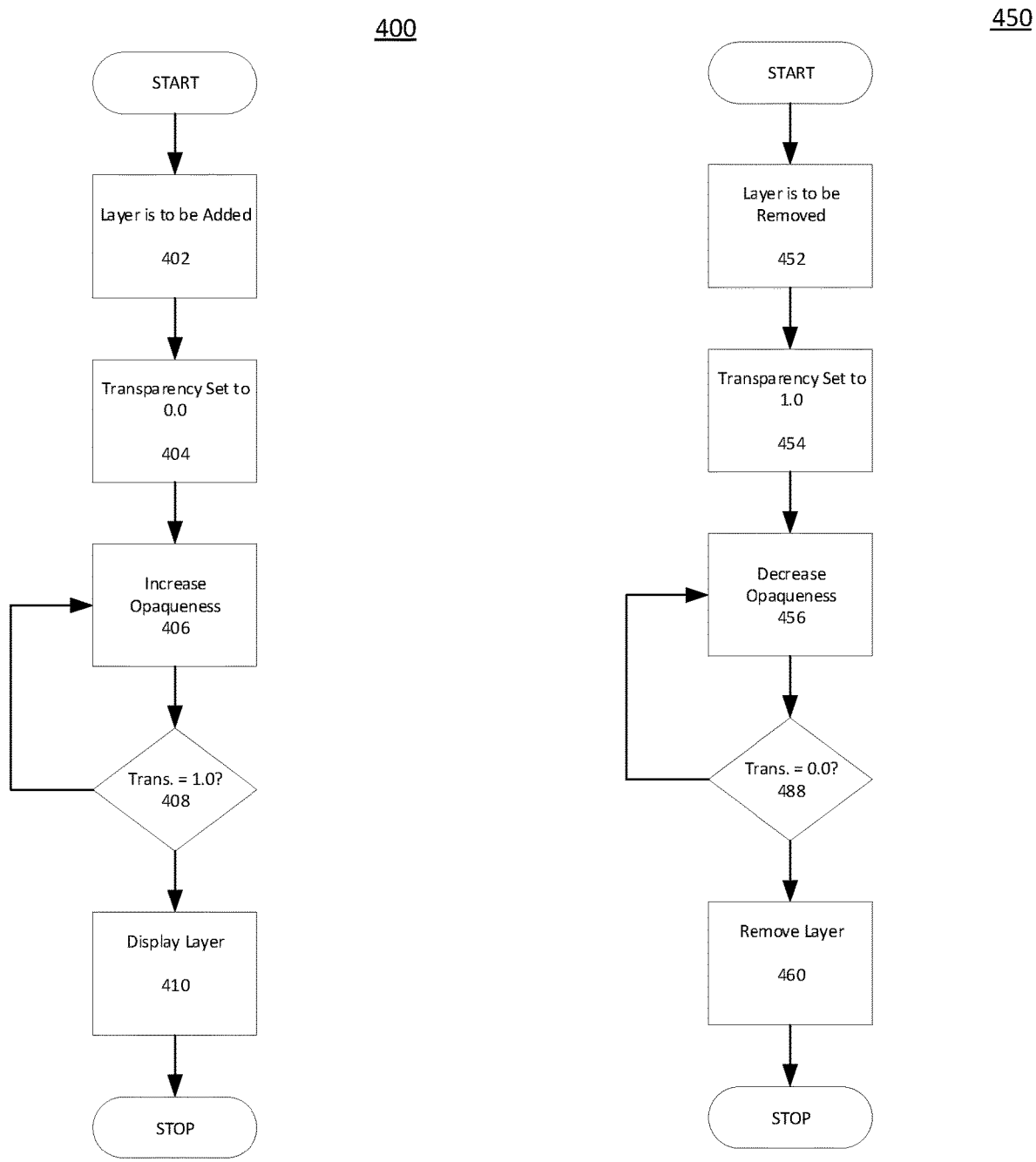
FIGS. 4A-4B show flowcharts for a method for generating an animated aircraft display with layers in accordance with one embodiment.

FIGS. 4A-4B show flowcharts for a method for generating an animated display with layers in accordance with one embodiment. Specifically, the flow diagrams illustrate how the system may add or remove a layer. As seen in FIG. 4A, the process starts upon receiving a request to change a layer that is being displayed 402. The change may be to pan a display, zoom a display, or add or remove layers from a display. FIG. 4A reflects the process 400 of adding a layer, while FIG. 4B reflects the process 450 of removing a layer.

When a layer is to be added 402, the transparency of the layer is initially set to zero 404. By initially setting the transparency to zero (corresponding to 100% transparent), abrupt changes to the display are prevented. The processor processes a logic loop where each time through the logic loop, the opaqueness of the respective layer is increased 406 by a predetermined fade delta (i.e., rate of change by a predetermined amount of increase) until the transparency equals one (corresponding to 100% opaqueness) 408. As the processor goes though the loop, the processor continually displays the respective layers according to their transparency values 410.

Likewise, when a layer is to be removed 452 as shown FIG. 4B, the transparency of the layer is initially set to one 454. By initially setting the transparency to one (corresponding to 100% opaqueness), abrupt changes to the display are prevented. The processor then processes a logic loop where each time through the logic loop, the opaqueness of the respective layer is decreased 456 by a predetermined "fade delta" (i.e., rate of change by a predetermined amount of decrease) until the transparency equals zero 488 (corresponding to 0% opaqueness). As the processor goes though the loop, the processor continually displays the respective layers according to their transparency values 460.

By controlling the fade delta, the processor can control how quickly the respective layer is added or removed from the display. For example, the fade delta may be user specific. In other words, each pilot or operator can define the rate at which layers are added or removed to the display. Fade delta values can be a constant or can be event driven based on events during aircraft operations. In other examples, some display features such as a traffic symbol may not be displayed when flight crews are performing long range planning tasks on a map since these types of targets are not typically discernable on map at long range. When a traffic alert event is present, the fade delta for turning on traffic display in response to the event will become instantaneous, thus allowing immediate visualization of the layer.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

The following description refers to elements or nodes or features being "connected" or "coupled" together. As used herein, unless expressly stated otherwise, "coupled" means that one element/node/feature is directly or indirectly joined to (or directly or indirectly communicates with) another element/node/feature, and not necessarily mechanically. Likewise, unless expressly stated otherwise, "connected" means that one element/node/feature is directly joined to (or directly communicates with) another element/node/feature, and not necessarily mechanically. Thus, additional intervening elements, devices, features, or components may be present in an embodiment of the depicted subject matter.

In addition, certain terminology may also be used in the following description for the purpose of reference only, and thus are not intended to be limiting. For example, terms such as "upper", "lower", "above", and "below" refer to directions in the drawings to which reference is made. Terms such as "front", "back", "rear", "side", "outboard", and "inboard" describe the orientation and/or location of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second", and other such numerical terms referring to structures do not imply a sequence or order unless clearly indicated by the context.

For the sake of brevity, conventional techniques related to signal processing, data transmission, signaling, network control, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set or may be distributed over different locations including over different storage devices, and may exist, at least partially, merely as electronic signals on a system or network.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A system for generating an animated display for an aircraft, comprising:
   a flight management system (FMS) configured to control one or more control systems of the aircraft based upon flight plan data for the aircraft; and
   a map layer display system that is controlled by the FMS, comprising:
      a plurality of displays, where each of the plurality of displays shows a different view of the flight plan data;
      a user interface (UI) system configured to receive user input; and
      a processor communicatively coupled to the plurality of displays and the UI, the processor configured to:
         determine when the user input received by the UI corresponds to a layer on one of the plurality of displays;
         increase opaqueness of the layer from zero percent to one-hundred percent at a predetermined rate of change when the user input includes a request to add the layer to one of the plurality of displays;
         decrease opaqueness of the layer from one-hundred percent to zero-percent at the predetermined rate of change when the user input includes a request to remove the layer from one of the plurality of displays,
         override the predetermined rate of change of opaqueness when a threat condition to the aircraft is detected in one of the plurality of displays so that rate of change in opaqueness is immediate; and
         generate instructions to display the layer at the opaqueness of the layer.

2. The system of claim 1, where the predetermined rate of change in the opaqueness of the layer is constant.

3. The system of claim 1, where the predetermined rate of change in the opaqueness of the layer is determined by events during operation of the aircraft.

4. The system of claim 1, where one of the plurality of displays is a lateral situation display.

5. The system of claim 1, where one of the plurality of displays is a vertical situation display.

6. The system of claim 1, where one of the plurality of displays is a synthetic situation display.

7. The system of claim 1, where the layer shows terrain data.

8. The system of claim 1, where the layer shows air traffic data.

9. The system of claim 1, where the layer shows flight plan data.

10. The system of claim 1, where the layer shows airspace data.

11. The system of claim 1, where the layer shows boundary data.

12. The system of claim 1, where the layer shows navigational fix data.

13. The system of claim 12, where the navigational fix data is an airport location.

14. The system of claim 12, where the navigational fix data is non-directional beacon (NDB) data.

15. The system of claim 12, where the navigational fix data is VHF omnidirectional range (VOR) data.

16. The system of claim 1, where the opaqueness of the layer is increased frame by frame when the layer is being added to one of the plurality of displays.

17. The system of claim 1, where the opaqueness of the layer is decreased frame by frame when the layer is being removed from one of the plurality of displays.

18. A method for generating an animated display, comprising:
   receiving a user request for a change in a layer shown on a display that shows a view of data, where the user request is received by a user interface (UI) that is part of a map layer display system;
   determining which specific layer corresponds to the user request for a change to the display;
   increasing opaqueness of the layer from zero percent to one-hundred percent at a predetermined rate of change when the user request is to add the layer to the display;
   decreasing opaqueness of the layer from one-hundred percent to zero percent at the predetermined rate of change when the user request is to remove the layer from the display, override the predetermined rate of change when a threat condition to the aircraft is detected in one of the plurality of displays so that rate of change in opaqueness is immediate; and generating instructions to display the layer at the set opaqueness on the display.

19. The method of claim 18, wherein the step of increasing the opaqueness of the layer comprises increasing the opaqueness frame by frame when the layer is being added to one of the plurality of displays.

20. The method of claim 18, wherein the step of decreasing the opaqueness of the layer comprises decreasing the opaqueness frame by frame when the layer is being removed from one of the plurality of displays.

* * * * *